United States Patent

Uhlig

[11] 3,892,829
[45] July 1, 1975

[54] METHOD OF MAKING BLOWN PLASTIC ARTICLES

[75] Inventor: Albert R. Uhlig, Toledo, Ohio

[73] Assignee: Owens-Illinois, Inc., Toledo, Ohio

[22] Filed: Oct. 3, 1973

[21] Appl. No.: 403,051

[52] U.S. Cl. .................... 264/89; 264/97; 264/98; 264/296; 425/DIG. 214; 425/DIG. 215
[51] Int. Cl. .......................................... B29c 17/07
[58] Field of Search ............ 264/89, 90, 92, 94, 96, 264/97, 98, 99, 294, 296; 425/326 B, 387 B, DIG. 214, DIG. 215

[56] References Cited
UNITED STATES PATENTS

| 3,579,622 | 5/1971 | Shaw et al. | 264/99 |
| 3,736,201 | 5/1973 | Teraoka | 264/98 X |

*Primary Examiner*—Jan H. Silbaugh
*Attorney, Agent, or Firm*—Philip M. Rice; E. J. Holler

[57] ABSTRACT

A method of making bottles or other blown articles of non-circular or irregular, cross-sectional configuration and of improved wall thickness uniformity. A tubular parison, either of the open-ended or closed-end variety, is blown into a pre-form of a volume, wall thickness and exposed outer surface area generally the same as that of the final article. Preferably, these dimensions of the pre-form are less than those of the final article to avoid pinching between the final blow mold sections. However, at least one cross-sectional dimension of the pre-form is larger than the equivalent dimension of the final article.

In the manufacture of bottles of oval cross-section, for example, the closure of the blow mold physically deforms the pre-form from its original circular cross-section to an oval shape. The pre-form is then blown to the final bottle shape. The combination of physical deformation and final blowing results in the accurate formation of difficulty blowable shapes of remarkably uniform wall thickness.

In the manufacture of articles of concavo-convex configuration, the blown pre-form again is of a volume, wall thickness and exposed outer surface area generally the same as that of the final article. The closure of the blow mold on the blown pre-form telescopes one portion of the blown pre-form into the remainder of the blown pre-form so that the overall concavo-convex configuration is obtained. Upon final blowing, minimal inflation is required and the concavo-convex shape is stabilized.

11 Claims, 15 Drawing Figures

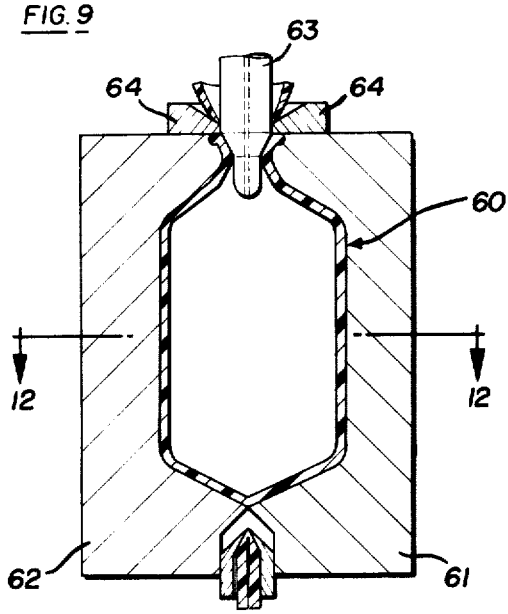
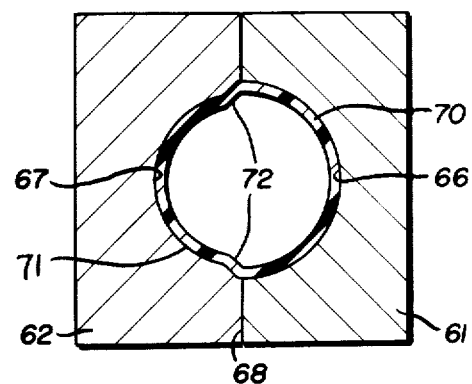
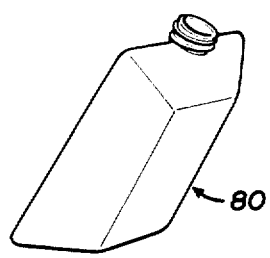
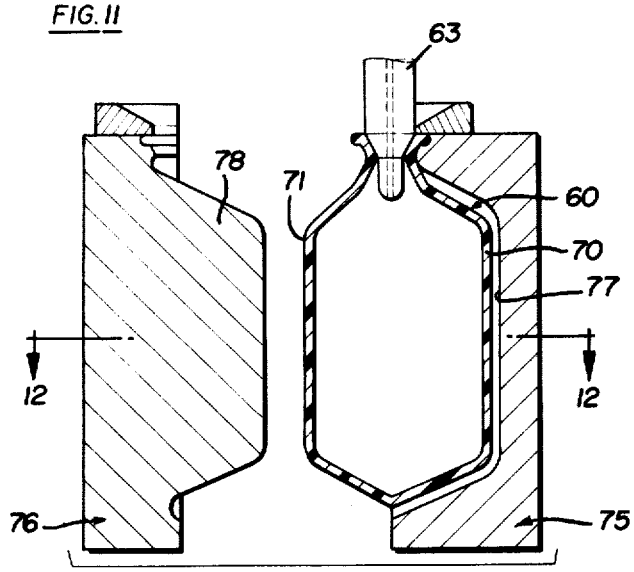
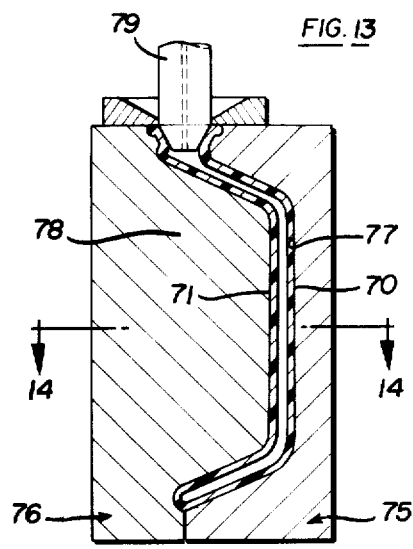
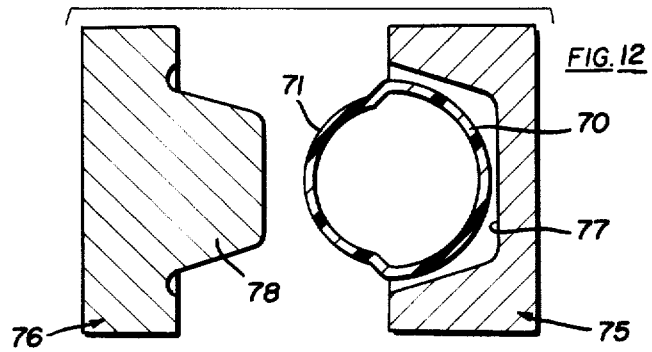
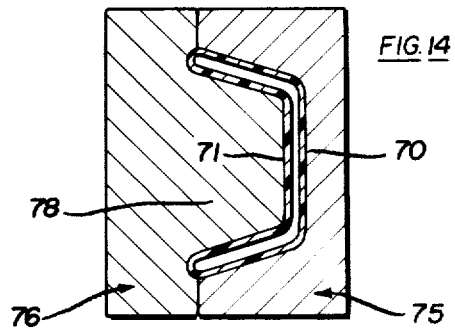

METHOD OF MAKING BLOWN PLASTIC ARTICLES

BACKGROUND OF THE INVENTION

In the blow molding of plastic articles, and particularly plastic containers, the formation of slopes of non-uniform, cross-section has always been quite difficult. In the inflation of a parison or pre-form of circular cross-section within a blow mold, the blown plastic wall becomes fixed the instant it strikes the chill wall of the surrounding mold. In the blowing of an oval shape, some portions of the mold wall are much closer to the initial parison than are other portions of the blow mold wall. As a result, the blown shape "lays up" on the mold wall in progressive fashion, and the blown wall diminishes in thickness as it travels to the more remote walls of the blow mold cavity. As a result, oval walls are always weak at their major dimensions and excessively strong at their minor dimensions.

Various attempts have been made in the prior art to avoid this condition, primarily by modifying the shape of the parison to a non-circular configuration. For example, the extrusion of an ovalized parison is possible, but costly equipment is required to maintain concentricity between the elements defining the oval extrusion orifice, and great skill and experience is necessary to successfully carry out the operation. Alternatively, it is possible to injection mold an oval parison, but expensive matched tooling is required for the parison formation and extremely accurate registration of the parison in the blow mold is required. All in all, the blowing of oval bottles has been and remains a problem in the art.

The blowing of extremely irregular shapes, such as concavo-convex shapes, has been practically impossible in the prior art. Here, the shape of the final article constitutes a radical departure from the shape of any known extruded or injection molded parison.

BRIEF DESCRIPTION OF THE INVENTION

This invention now proposes a method of making bottles and other blown articles of oval or non-circular configuration and of substantially uniform wall thickness from a parison of circular configuration. Preferably, for reasons of economy, the present invention utilizes a freely extruded tube as a parison, although the invention is equally applicable to an injection molded parison of circular configuration, if desired.

The tubular parison is blown into an initial pre-form and this pre-form is finally blown to the desired configuration in a final blow mold. Of course, the blowing of pre-forms for various purposes has been suggested in the art, but the present invention proposes definite correlations between the sides, shape and configuration of the pre-form and the final container and novel manipulative steps for converting the pre-form into the desired final article.

More specifically, the pre-form is of a volume, wall thickness and exposed outer surface area carefully correlated with these dimensions of the final article. Generally, the pre-form is of a volume somewhat less than the volume of the final article, to avoid pinching of the pre-form during closure of the final blow mold. The wall thickness of the pre-form is substantially the same as the wall thickness of the major portions of the final blown article, and the exposed outer surface area of the pre-form is somewhat less than that of the final blown article. Preferably, the volume of the pre-form is not more than about 25 percent less than the volume of the final blow molded article, so that the shaping of the final article in the final blow mold is accomplished to a minor extent only by the final blowing operation. Of course, the other dimensional characteristics, the average overall wall thickness and the exposed outer surface will vary accordingly with the difference in volume.

At least one cross-sectional dimension of the pre-form is larger than the equivalent dimension of the final article. Any oval or other non-circular bottle has, in cross-section, a major axis and a minor axis. For purposes of terminology, the greatest cross-sectional dimension is called "the major axis" while the smallest cross-sectional dimension is called "the minor axis." For example, the square bottle, the distance across the corners would be the major axis, with the distance between the sides being denoted as the minor axis. The blown pre-form is of a cross-sectional dimension which is intermediate the major and minor dimensions of the bottle cross-section. Further, the blown pre-form is preferably circular in cross-section, since such cross-section accommodates a uniform "blow-up" ratio and a uniform wall thickness when the pre-form is blown from a tubular parison.

In the blowing of bottles, the split line of the final blow mold generally coincides with the major axis of the final blown article. Thus, each of the two cooperating final blow mold sections has a relatively shallow cavity recess at its interior or mating face, this cavity being elongated in the direction of the split line.

By the method of the present invention, the blown pre-form is positioned intermediate the closable sections of the final blow mold, and the blow mold sections then are closed transversely onto the blown pre-form. As the blow mold sections close, they contact the pre-form and physically deform the pre-form therebetween. The blown pre-form contacts the walls of the blowing cavity and the pre-form walls are immediately chilled and set by such contact. As the closure of the blow mold sections proceeds, the pre-form of circular configuration is gradually, physically deformed to an oval configuration with the pre-form wall progressively contacting and being thermally stabilized along the blow mold cavity walls. When the blow molds are completely closed, the blown pre-form is of oval shape generally conforming to the final blow mold cavity but, because of the lesser volume of the pre-form, not completely filling the blow mold cavity. In this way, the pre-form is not pinched between the closing blow mold sections and no external flash is formed.

Finally, blow air is introduced into the physically deformed, blown pre-form and the pre-form is blown to the final configuration of the container by completing the lay-up of the pre-form wall along the cavity-defining walls of the blow mold sections. Preferably, the blow mold is designed to be of the maximum volume possible prior to final blowing without the formation of external flash. The final blow molding normally forms the major cross-section axial dimension of the container and finally forms the shoulders and heels of the container, the great majority of the final configuration of the container having been formed during the physical deformation of the pre-form as the blow mold sections close on it.

The present invention can also be utilized in the formation of difficulty blowable concavo-convex shapes.

Various articles of this overall shape can be made, such as serving dishes or trays, boat hull sections, bicycle seats, and the like.

Generally, the blown pre-form is of an overall oblate or cylindrical configuration. This blown pre-form is then deformed physically during the closure of a pair of blow mold sections. One of these sections has a concave recess of the normal type therein, but the other section has a convex protuberance which is telescopically received in, yet spaced from, the concave recess when the blow molds are closed. As the blow molds close, the convex protuberance contacts the blown pre-form and telescopes the contacted portion interiorally of the remainder of the pre-form. When the blow mold sections are closed, the article is finally inflated to its final concavo-convex configuration.

This unique combination of physical deformation of the blown pre-form and the final blowing of the pre-form results in the accurate formation of difficulty blowable shapes with walls of remarkably uniform thickness and without the formation of exterior flash.

It is, therefore, an important object of the present invention to provide a method of making a blown plastic article of non-uniform cross-sectional configuration by blowing a pre-form, physically deforming the pre-form during the closure of a blow mold onto the pre-form, and then blowing the pre-form to the final article configuration.

Another important object of this invention is the provision of a method of blowing a container or the like from a blown pre-form which is larger in at least some of its dimensions than the final article, the pre-form being of lesser volume than the final article, and the pre-form being physically deformed during closure of the blow molds and prior to a final blow molding operation to provide a final blown article of substantially uniform wall thickness.

It is yet another, object of the present invention to provide a method of making a container or the like of oval configuration from a tubular parison by blowing the parison to a pre-form having substantially constant wall thickness, of a volume less than the volume of the final container and having at least one dimension larger than the corresponding dimension of the final container, physically deforming the pre-form prior to blowing, and finally blowing the pre-form to the volume and shape of the final article while maintaining the uniform wall thickness of the blown pre-form throughout the greater part of the final article.

Still another, and no less important, object of the present invention is the provision of a method of making a concavo-convex article by blowing a parison into a pre-form of substantially constant wall thickness, interposing the blown pre-form between a pair of blow mold sections, one of the sections having a concave interior cavity recess and the other of the sections having a convex protuberance enterable into the concave cavity of the first section, physically deforming the blown pre-form by its contact with the convex protuberance of the second mold section during closure of the blow mold sections, and finally blowing the deformed concavo-convex blown pre-form to its final configuration within the closed molds.

Other and further objects of the present invention will become apparent from the following description of the invention and the appended claims.

ON THE DRAWINGS

FIG. 9 is a view similar to FIG. 1 illustrating the formation of a different form of blown pre-form;

FIG. 10 is a sectional view taken along the plane 10—10 of FIG. 9;

FIG. 11 is a vertical sectional view illustrating the positioning of the blown pre-form between a pair of closable blow mold sections;

FIG. 12 is a sectional view taken along the plane 12—12 of FIG. 11;

FIG. 13 is a view similar to FIG. 11 but illustrating the blow molds closed and the article in its finally blown configuration;

FIG. 14 is a sectional view taken along the plane 14—14; and

FIG. 15 is an elevational perspective view illustrating the final article.

AS SHOWN ON THE DRAWINGS

Figure 1:
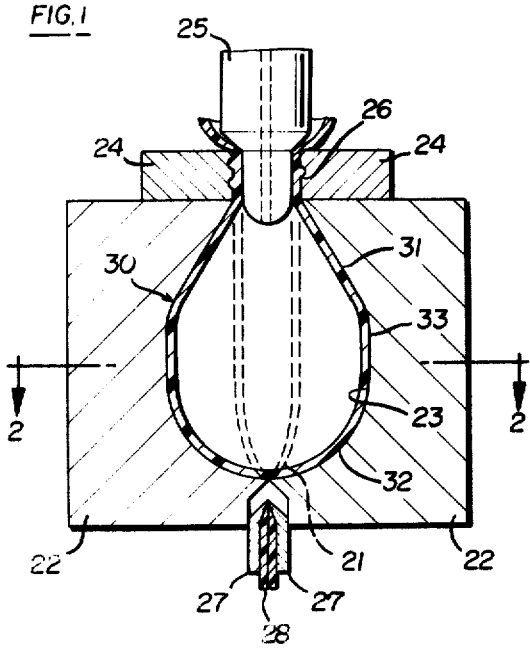
FIG. 1 is a schematic representation of the initial step of the method of the present invention wherein a tubular parison is blown and formed into a blown pre-form.

In FIG. 1, reference numeral 20 refers generally to a tubular parison formed by conventional parison forming techniques, preferably as a freely extruded, pendant tube of which is pinched shut at its lower end, as at 21 between a pair of pre-form blow molds indicated generally at 22. The pre-form blow mold sections 22 cooperatively define an interior pre-form mold cavity 23. The mold sections 22 are surrounded by sectional neck mold blocks 24 which cooperate with a blow pipe 25 to define a threaded finish 26 at the upper end of the tubular parison 20. Blow air introduced through the blow pipe 25 expands the tube 26 radially outwardly within the confines of the cavity 23 to form the blown pre-form 30. A pair of cooperating puller blocks 27 are carried by the blow mold sections 22, respectively, these blocks 27 being actuatable, as well known in the prior art, to remove the "tail" 28 formed when the tubular parison 20 is pinched on closure of the blow mold 22.

Figure 2:
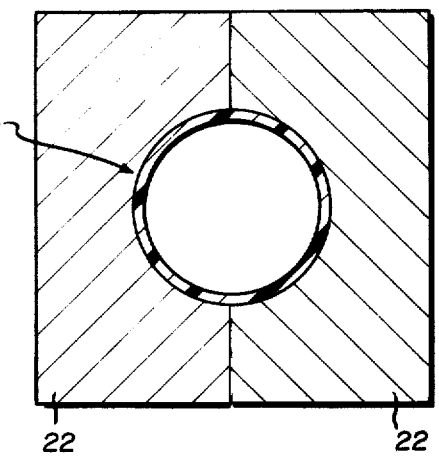
FIG. 2 is a cross-sectional view taken along the plane 2—2 of FIG. 1.

As illustrated in FIGS. 1 and 2, the blown pre-form 30 is circular in cross-sectional configuration and use of a generally elongated longitudinal configuration having sloping, somewhat conical upper portions 31 and a rounded, generally hemispherical bottom portion 32. The maximum cross-sectional portion of the pre-form 30 is defined by cylindrical side wall portions 33. Due to its general shape and particularly to its circular configuration in cross-section, the pre-form 30 is easily and readily blowable from the tubular parison 20 and the generally uniform blow-up ratio means that the wall thickness of the pre-form 30 is substantially constant throughout the blown portions thereof. This uniformity of wall thickness is important to the present invention and the pre-form 30 can be of any shape which can be made from the tubular parison 20 and in which such substantially uniform wall thickness is obtained.

Next, according to the method of the present invention, the pre-form blow mold sections 22 are opened, as are the neck mold blocks 24, and the blown pre-form 30 is transferred to a blow molding location on the blow pipe 25. Alternatively, the blow pipe 25 can be retracted with the mold sections 22 and the neck blocks 24 in position and a final blow pipe 35 can be inserted into the open neck of the pre-form. After such insertion, the mold sections 22 and the neck mold blocks 24 are opened and the blow pipe 35 transfers the blown pre-form 30 to the final blow molding station of FIG. 3.

Figure 3:
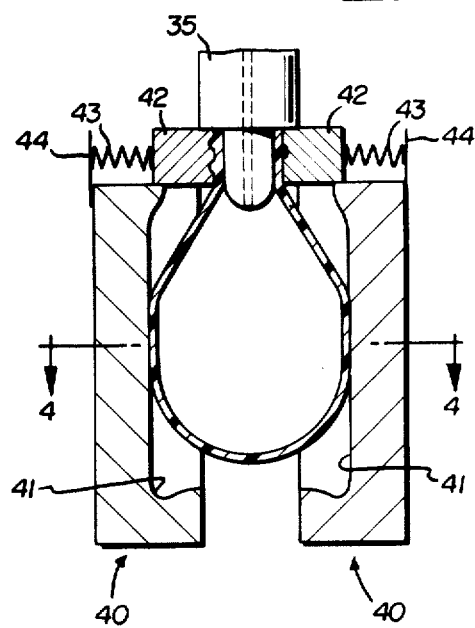
FIG. 3 is a schematic representation of an additional step of the method of the present invention wherein a pair of final blow molds are closed onto the blown pre-form to physically deform the pre-form.

At the final blow mold station of FIG. 3, a pair of final blow molds indicated generally at 40 are closed on the blown pre-form. These final blow mold sections 40 have interior cavity-defining walls 41 cooperatively defining the shape of the final blown article. From FIG. 4, it will be seen that the cavity walls 41 are elongated transversely to define a final blow mold cavity which is an elongated oval, as best seen in FIG. 8.

Each blow mold section 40 is surmounted by a container finish-defining block 42 urged by a compression spring 43 reacting against the stop 44 onto contact with the finished portion of the pre-form 30 surrounding the blow pipe 35. From a comparison of the shape of the pre-form 30 and the shape of the final bottle of FIG. 11, it will be seen that it is necessary to flatten and physically deform the pre-form to the elongated oval shape of the final article. This change in the shape of the blown pre-form is carried out by simply closing the blow mold sections 40 onto the blown pre-form by the normal external actuating means for the blow mold sections 40, as is well known in the prior art. As the blow mold sections progressively close, as illustrated in FIGS. 3–8, inclusive, it will be seen that the blow mold cavity walls 41 first contact the cylindrical side walls of the pre-form 30. The walls 31 form chilling surfaces which immediately set the still warm pre-form wall to its final configuration and at the exact wall thickness of the pre-form as it was blown internally of the pre-form blow molds 22. As the blow mold sections 40 close, it will be seen that the chill walls 41 progressively contact the blown pre-form and "ovalize" the pre-form to a configuration which progressively more closely approaches that of the final bottle of FIG. 11. As the chill walls progressively contact each portion of the blown pre-form, the contacted portion is chilled and set at its original wall thickness so that the wall thickness of the original blown pre-form 30 is preserved.

Figure 7:
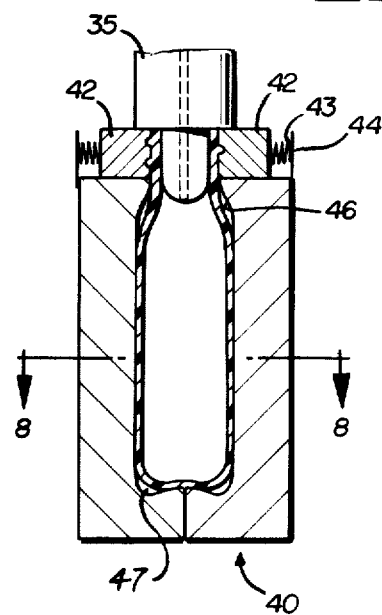
FIG. 7 is a view similar to FIGS. 3 and 5 showing the final closure of the blow mold sections onto the blown pre-form and just prior to the final blowing of the container.
Figure 8:
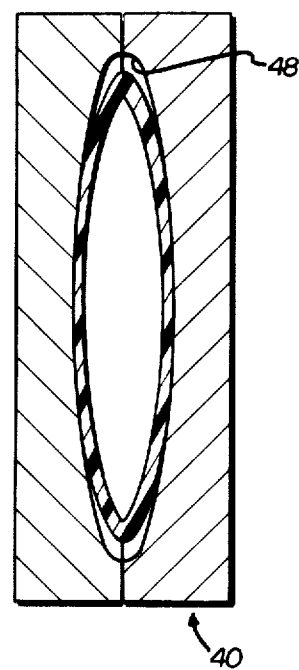
FIG. 8 is a sectional view taken along the plane 8—8 of FIG. 7.

When the blow mold sections 40 are fully closed, as illustrated in FIGS. 7 and 8, the blown pre-form has been physically and mechanically deformed into substantial conformity with the shape of the final bottle of FIG. 11, yet the wall thickness of the original pre-form has not been changed. Also, it will be seen that the shoulder portion 46, the heel portions 47 and the extreme remote portions 48 of the final blow mold cavity have not yet been filled by the physically deformed blown pre-form 30. Once the blow molds have been completely closed as illustrated in FIGS. 7 and 8, blow air is then introduced through the blow pipe 35 into the interior of the blown pre-form and it is inflated into exact conformity with the blow mold cavity. By this blowing, the remaining portions 46, 47 and 48 of the blow mold cavity are filled and the final bottle shape is fully obtained.

It will be seen that the final bottle configuration is that of an elongated oval, in cross-section. This oval configuration has a minor axis which is substantially less than the major axis.

The diameter of the pre-form is intermediate the dimensions of the minor axis and the major axis of the final bottle configuration, and the height of the pre-form is substantially less than the final height of the bottle. From the standpoint of volume, the volume of the pre-form is substantially the same, but always less than, the volume of the final bottle. In this way, the pinching of the blown pre-form during closure of the final blow mold sections 40 can be avoided. The difference between the volume of the pre-form and the volume of the final bottle will be variable in accordance with the relative shapes, but, preferably the volume of the blown pre-form is not more than about 25 percent less than the volume of the final container. This minimal volume difference is desirable in order to preserve the uniform wall thickness of the blown pre-form in the final bottle, so far as possible. Also, this means that the blow-up ratio during the final blow operation of FIGS. 7 and 8 is as small as possible to avoid excessive thinning of the material at the shoulders, heels and remote portions of the final container.

The wall thickness of the pre-form is preserved and maintained exactly at those portions of the final container which are formed during the closure of the final blow mold sections 40 and prior to the final blowing step. As will be appreciated from an inspection of FIGS. 7 and 8, by far the greater part of the final container is of the same wall thickness as the blown pre-form. The exposed outer surface area of the blown pre-form relative to the exposed outer surface area of the final container is important again to avoid pinching of the pre-form during the final closure of the final blow mold sections 40. Thus, the exposed outer surface area of the pre-form is always less than the exposed outer surface area of the container, but this difference is minimized in order to avoid excessive blow-up ratios and resultant thinning of that liner portion of the container formed by the final blowing operation.

Figure 4:
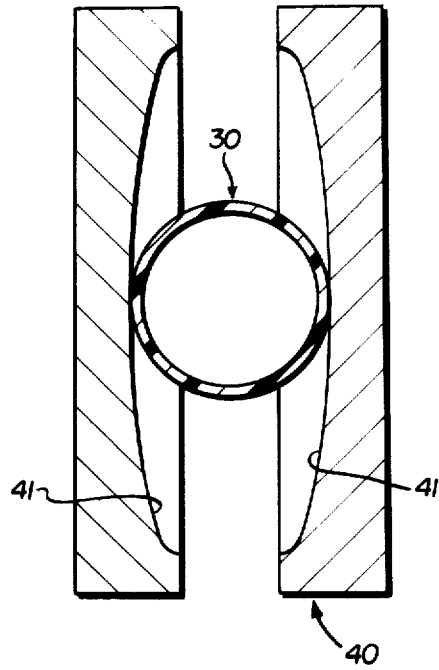
FIG. 4 is a cross-sectional view taken along the plane 4—4 of FIG. 3.
Figure 5:
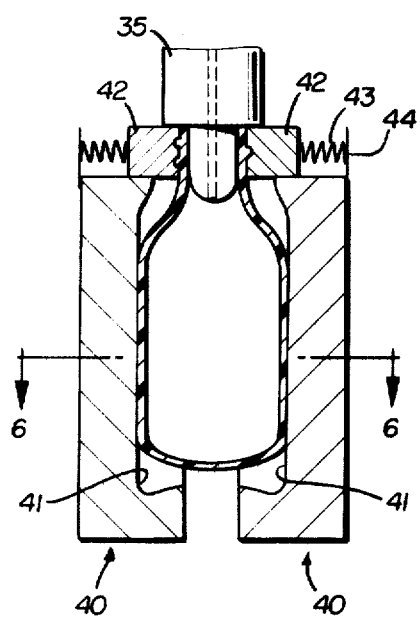
FIG. 5 is a view similar to FIG. 3 illustrating the further closure of the final blow mold and the further deformation of the blown pre-form.
Figure 6:
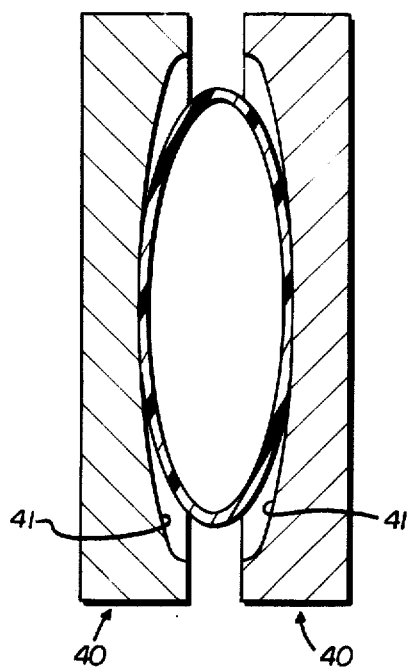
FIG. 6 is a sectional view taken along the plane 6—6 of FIG. 5.

By an inspection and comparison of FIGS. 3 and 4 with FIGS. 5 and 6 and with FIGS. 7 and 8, it will be seen that the minor cross-section axial dimension of the final container is defined and fixed during the initial closing of the blow mold sections 40, while the major cross-sectional dimension is fixed and defined during the final blow molding operation. By far the greater portion of the final container is formed and fixed during the closure of the blow molds and by the physical deflection and deformation of the blown pre-form by contact between the blow mold sections 40 and the pre-form 30 prior to the final blowing operation. The resultant advantages in uniform wall distribution throughout the container and the provision of means for forming extremely dimensioned articles from a tubular parison 20 will be readily appreciated by those skilled in the art.

Turning now to that embodiment of the invention illustrated in FIGS. 9 through 15, it will be seen that a blown pre-form 60 (FIG. 9) is formed by blowing interiorly of pre-form blow mold sections 61, 62. The blowing is accomplished by means of a blow pipe 63 inserted through neck blocks 64.

From FIGS. 9 and 10, it will be seen that the blown pre-form 60, while essentially circular in cross-sectional configuration, is not truly circular. The pre-form cavity 66 in the blow mold half 61 is larger than the pre-form cavity 67 in the blow mold half 62. As a result, the blown pre-form 60 comprises a pair of semi-cylindrical halves disposed to either side of a vertical section plane coinciding with the parting line 68 of the blow mold sections 61, 62. Thus, one half 70 of the blown pre-form 60 is larger in radius than the other half 71 of the blown pre-form 60. Radially inclined joining sections 72 disposed adjacent the parting line 68 join the two pre-form portions 70, 71.

The purpose of this configuration of the blown pre-form will become immediately apparent from a study of FIGS. 11 and 12. Following blowing of the pre-form 60, the pre-form is transferred to a blow molding station while still supported upon the blow pipe 63. At the blowing station, the pre-form 60 is interposed between a pair of sectional blow mold halves 75, 76. The blow mold half or section 75 is conventional in configuration, having a concave interior recess 77 conforming generally to the shape of the convex portion of the final article. The other blow mold section 76 is provided with a convex protuberance 78 which projects radially of the longitudinal axis of the blown pre-form 60, the contour of this convex protuberance 78 conforms to the concave portion of the final article.

Next, the blow mold sections 75, 76 are progressively closed onto the blown pre-form 60. As the mold sections close, the protuberance 78 contacts the portion 71 of the blown pre-form 60 to deform the portion 71 from its initial convex configuration to its final concave configuration. Actually, the protuberance 78 contacts the pre-form and sets the thickness of the pre-form, as has been heretofore explained in detail. As the blow molds close, the mold protuberance 78 telescopes into the mold concave recess 77, and the smaller portion 71 of the pre-form 60 likewise telescopes into the larger portion 71 of the pre-form.

When the blow mold sections 75, 76 are finally closed, it will be seen that the article has been deformed into a concavo-convex configuration, but without completely filling the mold cavity cooperatively defined by the convex protuberance 78 and the concave recess 77. Finally, blow air is introduced through a final blow pipe 79 and the final article 80 is formed.

All of the advantages heretofore recited in connection with the blowing of ovalized bottles, can be obtained in the formation of concavo-convex articles by the technique set forth in FIGS. 9–15, inclusive.

I claim:

1. In a method of making a blow molded article of non-circular cross-section from a generally tubular plastic parison of essentially circular cross-section and of substantially uniform wall thickness, the steps of:
   1. blowing the parison to the shape of a pre-form within a first blow mold cavity, said pre-form having a substantially uniform wall thickness and an exposed outer surface approximately the same as but less than the exposed outer surface of the article,
   2. interposing the pre-form between a pair of blow mold sections which, when closed, have cavity-defining walls spaced apart a distance less than the cross-sectional dimension of said pre-form,
   3. simultaneously (a) closing the mold sections progressively on said pre-form, (b) progressively deflecting the pre-form by its contact with said walls to a shape closely approaching that of said article, and (c) thermally stabilizing the contacted portion of the pre-form, while preserving the substantially uniform wall thickness and the exposed outer surface of said pre-form, and
   4. finally blowing the deflected shape to complete the formation of said article interiorly of the closed mold sections.

2. A method as defined in claim 1, wherein the article is oval in configuration and the blown essentially circular pre-form is progressively ovalized as the blow mold sections close on the pre-form.

3. A method as defined in claim 1, wherein the article is concavo-convex in configuration and one-half of the blown, essentially circular pre-form is progressively deformed to a concave configuration as the blow mold sections close on the pre-form.

4. In a method of making a blow molded article of non-circular concavo-convex cross-section from a blown pre-form the steps of
   1. forming a blown preform of substantially circular cross section and substantially uniform wall thickness and including two portions of different radii, each of said portions being generally semi-cylindrical;
   2. interposing the pre-form between a pair of blow mold sections which, when closed, have cavity-defining walls spaced apart a distance less than the cross-sectional dimension of said pre-form, one of said sections having concave walls and the other of said sections having convex walls;
   3. closing the mold sections progressively on said pre-form with the convex walls of said other section progressively deflecting the portion of said pre-form having a smaller radius toward the other portion of said pre-form during closure to define a shape more closely approaching that of the concave portion of said article, while preserving the substantially uniform wall thickness of said pre-form, and
   4. finally blowing the deflected shape to complete the formation of said article interiorly of the closed mold sections.

5. In a method of making a hollow article of non-circular cross-section and having walls partially telescoped relative to one another, the steps of
   forming a blowable parison, blowing said parison within a first mold into an oblate pre-form of a wall thickness substantially the same as the wall thickness of said final article, the pre-form when viewed in section having arcuate, semi-cylindrical walls of differing radii,
   closing onto said pre-form a second, sectional blow mold, a first section of said mold having an interior concave recess and a second section of said mold having a convex projection enterable into said recess when said sections are closed, said sections cooperating to define a blow mold cavity conforming to the shape of the final container, contact between the projection of the second section and the arcuate, semi-cylindrical wall of said pre-form of lesser radius (a) physically deforming the pre-form during the closure of the mold sections to telescope the arcuate wall of lesser radius within the arcuate wall of larger radius and (b) thermally stabilizing at least a portion of the walls of the article at the wall thickness of said pre-form, and finally blowing the deformed and mold-enclosed pre-form into the shape of the final article.

6. In a method of making a container of noncircular cross-section from a tubular parison, the steps of:
  1. forming a blowable parison,
  2. inflating the parison within a first mold cavity into a pre-form having an exposed outer surface area less than but generally the same as the exposed outer surface area of said container, and having at least one cross-sectional dimension greater than the equivalent dimension of said container,
  3. positioning the pre-form between the open sections of a second, sectional blow mold which, when closed, define a cavity conforming to the shape of said container,
  4. closing said sections onto said pre-form, the sections contacting and deforming the pre-form prior to complete closure of said sections, due to the greater dimension of said pre-form, and the lesser surface area of said pre-form preventing pinching of the pre-form during such section closure,
  5. thermally stabilizing the contacted portions of the pre-form during Step (4) and thereby substantially maintaining the outer exposed surface area of said pre-form; and
  6. blowing the deformed pre-form in said cavity after complete closure of said sections.

7. A method as defined in claim 6, wherein the volume of the pre-form is not more than about 25 percent less than the volume of the final container and the pre-form is expanded by not more than 25 percent during the performance of step (5).

8. A method as defined in claim 6, wherein the container is oval having major and minor cross-sectional axes and the pre-form is circular in cross-section, the minor cross-section axial dimension of the container being fixed during the performance of step (4) and the major cross-sectional dimension being fixed during the performance of step (5).

9. In a method of making a concavo-convex article from a tubular parison, the steps of:

forming a blown pre-form of substantially circular cross-section and substantially uniform wall thickness and including two portions of different radii, each of said portions being generally semi-cylindrical; the exposed outer surface area of the pre-form being less than the exposed outer surface area of said article;

positioning the pre-form between the open sections of a sectional blow mold which, when closed, define a cavity conforming to the concavo-convex shape of said article, closing said sections onto said pre-form, one of the sections contacting and deforming the portion of the pre-form having a smaller radius telescopically into the remainder of the pre-form prior to complete closure of said sections, and the lesser surface area of said pre-form preventing pinching of the pre-form during such section closure, and blowing the deformed, telescoped pre-form in said cavity after complete closure of said sections.

10. In a method of making a blow molded article of non-uniform cross-section from a blowable plastic parison, the steps of:
  1. inflating said parison within a first mold cavity into a generally cylindrical pre-form having a wall thickness and exposed outer surface area substantially the same as the wall thickness and exposed outer surface area of said article,
  2. interposing the pre-form between a pair of blow mold sections which, when closed, have interior cavity-defining walls spaced apart a distance less than the cross-sectional dimension of said pre-form,
  3. progressively closing said mold sections onto said pre-form and (a) progressively contacting a portion of the exposed outer surface of the pre-form with a portion of the cavity-defining walls, (b) thermally stabilizing the contacted portion of said pre-form outer surface, (c) physically deforming the pre-form substantially to the shape of the final article, while (d) maintaining the exterior exposed surface area of said pre-form substantially constant, and
  4. blowing the deformed and mold-enclosed pre-form into the shape of the final article by expanding the non-contacted, non-stabilized portions of the pre-form.

11. The method defined in claim 10, characterized by closure of said mold sections in Step (3) avoiding pinching of said pre-form due to the exposed outer surface area of said pre-form being less than the exposed outer surface area of said article.

* * * * *